United States Patent [19]

Hegemann et al.

[11] 4,316,727
[45] Feb. 23, 1982

[54] ANNULAR-GAP WASHER INCLUDING ELECTRODE MEANS

[75] Inventors: Karl-Rudolf Hegemann, Essen-Bergerhausen; Johannes W. Kautz, Heiligenhaus; Helmut Weissert, Bochum-Hiltrop, all of Fed. Rep. of Germany

[73] Assignee: Gottfried Bischoff Bau Kompl. Gasreinigungs- und Wasserrückkühlanlagen GmbH & Co. KG, Essen, Fed. Rep. of Germany

[21] Appl. No.: 198,042

[22] Filed: Oct. 17, 1980

[30] Foreign Application Priority Data

Oct. 18, 1979 [DE] Fed. Rep. of Germany ......... 294213

[51] Int. Cl.$^3$ ............................................... B03C 3/16
[52] U.S. Cl. ......................................... 55/107; 55/113; 55/138; 55/149; 261/DIG. 54; 261/DIG. 56
[58] Field of Search ................. 55/107, 113, 118, 122, 55/138, 149, DIG. 25; 261/DIG. 54, DIG. 56; 361/228

[56] References Cited

U.S. PATENT DOCUMENTS

| 3,053,029 | 9/1962 | De Seversky | 55/118 |
|---|---|---|---|
| 3,218,781 | 11/1965 | Allemann et al. | 55/122 |
| 3,492,790 | 2/1970 | Ebert | 55/118 |
| 3,668,835 | 6/1972 | Vicard | 55/107 |
| 3,716,966 | 2/1973 | De Seversky | 55/138 |
| 3,729,898 | 5/1973 | Richardson | 55/107 |
| 3,890,103 | 6/1975 | Konishi | 55/118 |
| 4,110,086 | 8/1978 | Schwab et al. | 55/107 |
| 4,123,238 | 10/1978 | Hegemann | 261/DIG. 54 |

FOREIGN PATENT DOCUMENTS 338238 6/1972 U.S.S.R. ................... 55/113

Primary Examiner—David L. Lacey
Attorney, Agent, or Firm—Karl F. Ross

[57] ABSTRACT

An annular-gap washer especially for scrubbing of industrial gases, comprises a central body which is axially shiftable in a housing defining an all-around clearance with the body. The clearance forms an annular gap through which the gas stream and water droplets from a spray nozzle axially spaced from the gap, are accelerated and brought into intimate contact. According to the invention at least over part of the gap, the mixture is subjected to an electrostatic field having generally radial field lines.

3 Claims, 4 Drawing Figures

# ANNULAR-GAP WASHER INCLUDING ELECTRODE MEANS

FIELD OF THE INVENTION

The present invention relates to an annular-gap washer for the scrubbing of industrial gases, e.g. converted exhaust gases, with water and, more particularly, to improvements in such scrubbing devices.

BACKGROUND OF THE INVENTION

In plants, e.g. metallurgical plants, in which industrial gases (for example converter exhaust gases) must be scrubbed with water before these gases are released into the atmosphere, it has been found that a high efficiency in particulate and soluble-component removal can be gained by utilizing a so-called annular-gap washer.

Reference may be made to U.S. Pat. Nos. 4,218,241, 4,152,123, 4,055,331, 4,052,042, 4,007,025, 3,854,908, 3,976,454, 3,844,744, 3,844,745 and 3,726,065 which show gas-cleaning installations for various purposes which may utilize annular-gap washers or scrubbers of the type with which the present invention is concerned and/or which may deal with structural details of such scrubbers.

In general, the scrubber comprises a central body, generally in the form of a body of revolution, surrounded by a housing or casing defining an all-around clearance with a central body which may be axially movable to adjust the gap width and hence the pressure drop across the flow path formed between the body and the surrounding housing through the annular gap therebetween. A spray nozzle can discharge a water spray, preferably in atomized form, at a location axially spaced from the central body and usually upstream of the gap in the direction of gas flow. Generally the central body and housing are of circular cross section and the gap is likewise of circular cross section. Wash water or other scrubbing liquid is generally collected downstream of the gap and is found to contain a large proportion, if not all, of the components of the gas stream which are soluble in the scrubbing liquid and the particulates which are washed out of the gas stream by the liquid.

After separating contaminants, scrubbing liquid is generally recirculated to the spray nozzle or nozzles.

The mixture of dust-containing gas and water droplets or the aerosol of water is accelerated in the gap and brought into intimate contact, thereby permitting the scrubbing liquid to pick up the dust particles.

In general, the housing through which the mixture passes converges toward the body which can have a drop configuration or the configuration of a frustocone and, like the housing, can have a converging-diverging configuration. The housing can, downstream of the constricted portion, be divergent as well.

The device thus may be in the form of a so-called diffuser washer.

In a diffuser washer, the flow passage is in the form of a venturi nozzle with a progressively constricting inlet portion and an outwardly divergent discharge portion and the shape may be that of a Laval nozzle.

In most constructions of scrubbers of this type, the central body is disposed primarily in the region of the discharge portion and can be generally conical in this region. The small end of the generally conical body may project beyond the constriction into the inlet side of the housing.

Thus, while the gas stream is accelerated by the constriction upon entering the gap, within the gap itself the mixture is decelerated or suffers no change in velocity. The device can be so shaped and dimensioned that a substantial linear pressure drop will appear across the length of the flow passage, i.e. a constant pressure gradient is formed along the axial length of the flow passage.

The scrubbing effectiveness, i.e. the degree to which particles are removed from the gas and the particle size ranges of the removed particles, and the efficiency are functions of the pressure differential across the gap which can be varied by axially shifting the central body. This axial shifting of the central body allows, as described in some of the patents mentioned above, control of various process parameters.

The particle-removal effect is a function in part of mechanical forces and actions which are applied to the dust particles and droplets of the scrubbing liquid and which are superimposed upon the thermodynamic phenomenon. The gas may become saturated with water, e.g. the scrubbing liquid, and evaporation and condensation phenomena may occur, the condensation resulting in precipitation of water and waste particles to facilitate the removal thereof from the gas.

Conventional annular-gap scrubbers operate by causing liquid droplets to adhere to dust particles or dust particles to adhere to water droplets so that the resulting droplet is relatively massive and separates because of its kinetic energy, momentum or inertial action from the gas stream, e.g. upon subjecting the gas to a direction change downstream of the annular-gap scrubber.

Thus it can be seen that an annular-gap scrubber is basically an inertial separator whose function is determined exclusively by mechanical/thermodynamic properties.

OBJECTS OF THE INVENTION

It is the principal object of the present invention to provide an improved annular-gap scrubber which has all of the advantages of the scrubbers previously described but, in addition, has a still greater separating efficiency or effect.

Another object of this invention is to provide a scrubber of the class described which, for a given set of mechanical and thermodynamic properties, has a better separating efficiency or effect than a scrubber with a corresponding set of mechanical and thermodynamic properties.

SUMMARY OF THE INVENTION

It has been found, most surprisingly, that the application of an electrostatic field in the gap, particularly one whose field lines run generally radially, can markedly improve separating efficiency in an annular-gap washer whose mechanical and thermodynamic properties otherwise are not altered.

According to the invention, therefore, an annular-gap washer having a central body which is axially shiftable, a housing surrounding this body with all-around clearance and defining an annular scrubbing gap herewith and spray means upstream of the scrubber for spraying scrubbing liquid into the gas stream to be scrubbed, is provided with at least one electrode is connected to a source of high voltage to generate an electrostatic field with substantial radial field lines across the annular scrubbing gap.

Naturally, the body and the housing, to the extent necessary to maintain this electrostatic field, must be insulated from other components and one another.

Advantageously the housing is grounded and the central body is provided with a plurality of electrodes, e.g. lying along generatrices, these electrodes being connected to the ungrounded terminal of the high-voltage (preferably direct current) source.

Alternatively, the central body may have a conductive surface connected to this later terminal and circumferentially continuous to form a single high voltage electrode.

According to the invention, the droplets of the scrubbing liquid as well as the dust particles traverse an electrostatic field of high intensity within the annular gap and may also be subjected to varying voltage gradients resulting from changes in electrical field strength. These dust particles and/or droplets of scrubbing liquid are electrostatically charged so that the particles appear to move in accordance with the laws of electrodynamics, a phenomenon which surprisingly has been found to improve the removal of dust by the liquid in spite of the fact that no portion of the device can truly be said to be a collecting electrode in the sense that this term is used in the electrostatic precipitator arts. Indeed, the phenomenon exploited by the present invention appears to be quite different from that which is exploited in electrostatic particle collection. Apparently the interaction of the liquid and the dust is improved by subjecting these particles, especially when they have been previously electrostatically charged, to the high field intensity within the gap.

The invention utilizes the fact that numerous industrial waste gases, especially converter gases and the stack gases of blast furnaces and the like, contain dust particles which are already electrostatically charged, i.e. possess a relatively negative charge without the use of discharge electrodes. These dust particles and the droplets of the scrubbing liquid thus possess different electrical charges so that, as the mixture of dust and particles traverses the gap across which the field is applied, electrodynamic movement is created in the particles to result in a more intimate contact and impact between the different types of particles. Collision probability is thereby increased and it is well known that the efficiency is a function of collision probability.

According to a feature of the invention, the charge on the particles is influenced or a charge is applied to uncharged particles.

Thus, according to this latter feature of the invention, the flow passage upstream of the central body of the annular-gap scrubber can be provided with corona discharge electrodes which serve to charge the dust particles preferably negatively while the water droplets receive an opposite electrical charge, e.g. a positive charge upon atomization. The positive charge may be applied to the water droplets by induction.

Region upstream of the gap thus can be formed with at least one negatively charged corona discharge electrode, having a portion which reaches toward the scrubbing-liquid spray and which picks up an opposite charge by induction. The negative charge of the corona electrode or electrodes, as is the case with electrostatic precipitators, is transferred to the duct particles, e.g. in the form of electrons, while the noncorona terminals of these electrodes, via induction, are positively charged and transfer positive charge to the water droplets.

According to another feature of the invention, the neutral body of the scrubber itself carries at least one electrode, e.g. a wire, forming a corona discharge.

In another case or when both cases are used simultaneously, a spray nozzle for the liquid is provided in axial alignment with but axially upstream of the gap and the central body.

While the present invention is applicable to all annular-gap washers, e.g. those using drop-shape central bodies as well as those of the diffuser type, best results have been found with diffuser scrubbers in the sense that extremely fine particles can be moved from the gas stream utilizing the present invention whereas particles of similar fineness cannot be removed with earlier diffuser scrubbers of otherwise similar geometry but without the electrostatic field.

BRIEF DESCRIPTION OF THE DRAWING

The above and other objects, features and advantages of the present invention will become more readily apparent from the following description reference, being made to the accompanying drawing in which.

SPECIFIC DESCRIPTION

Figure 1:
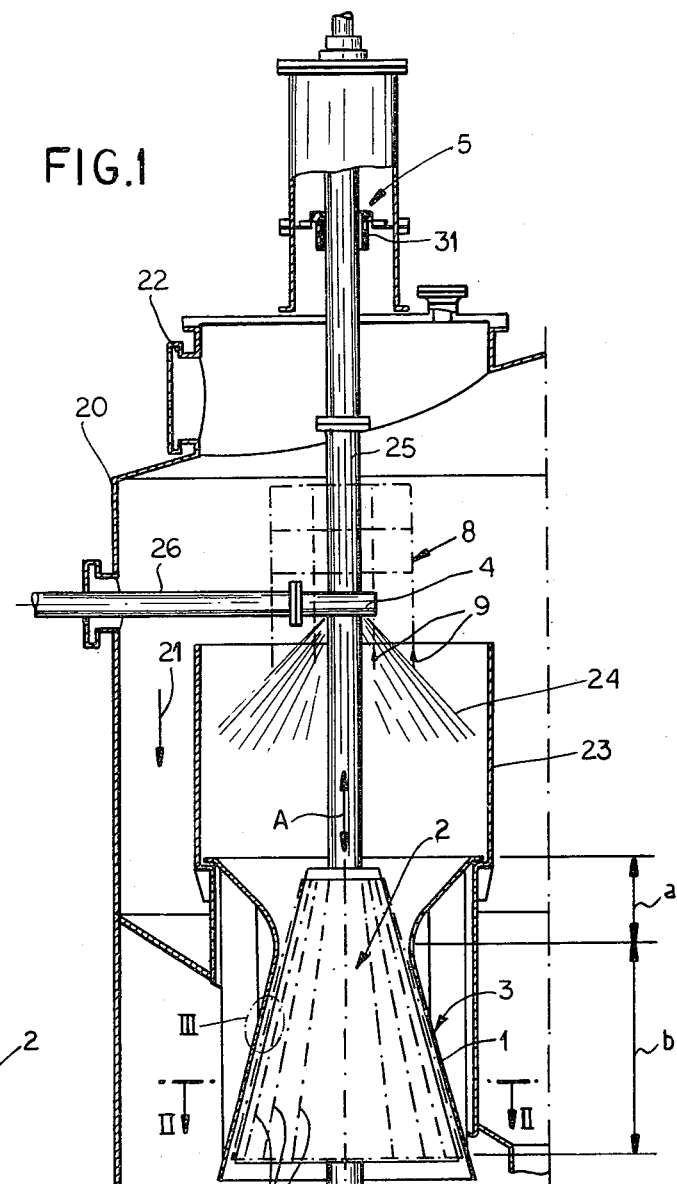
FIG. 1 is a partial section through an annular-gap scrubber which can be incorporated in a scrubbing tower, e.g. as described in the aforementioned patents.
Figure 2:
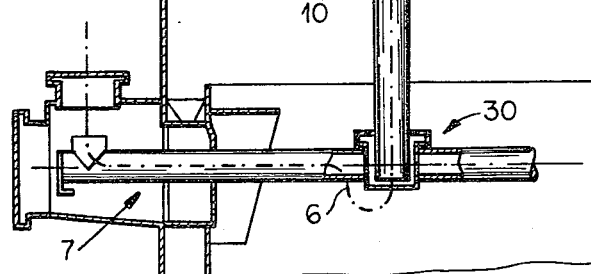
FIG. 2 is a section taken generally along the line II—II of FIG. 1.

The annular-gap scrubber shown in FIG. 1 serves to scrub with water an industrial gas, especially converter gas, and the annular gap of the scrubber as well as the central body and the surrounding casing all have similar cross sections. The column in which the scrubber is provided may have a plurality of such scrubbers in angularly equispaced relationship.

The central body 2 is a frustoconical configuration and defines an annular gap flow passage 1 with a housing 3 of converging diverging diffuser construction. The gap width is adjustable by axially shifting the central body in the direction of the double head arrow A utilizing, for example, a hydraulic or pneumatic cylinder 5.

Axially spaced above the scrubber is an atomizing nozzle 4 for spraying water into the gas stream traversing the housing 20 in the direction of arrow 21. The gas stream is introduced at the head of the housing 20 via the duct 22 and passes downwardly through a cylindrical partition 23 surrounding the spray 24 from nozzle 4. This annular nozzle 4 surrounds a shaft 25 which is axially displaced by the cylinder 5 and is supplied with water by a pipe 26. The flow passage 1 is formed at least partly in the region of the body 2 with means for applying an electrostatic field across the annular gap with generally radial field lines. To this end the casing 3 may have a wall 27 of electrically insulating material along with a layer 28 of metal, preferably stainless steel or other material of low corrodibility and connected to ground or one terminal of a high voltage direct current source 29. The other terminal of this source is connected to an array of electrodes 10 which can be recessed in the electrically insulating body 2 and which has been shown in dot-dash lines in FIG. 1.

Voltage is applied to the electrodes 10, which function as discharge electrodes as field-generating electrodes by lead 6 through insulating number 30, another insulating number 31, being provided for the shaft 25 at its upper end.

A centering and holding device 7, through which a conductor 6 passes, is provided for the lower end of the body 2. In the embodiment of FIG. 1, therefore, only the discharge electrodes 10 are connected to the high voltage DC source whose other terminal is grounded as is the housing 3.

A cage 8 has been shown in dot-dash lines in FIG. 1 and is disposed upstream of the body 2 and is formed with conical discharge electrodes having non-discharge terminal portions 9 in the region of the nozzle 4. This cage serves to charge the dust particles negatively and water particles positively.

Figure 4:
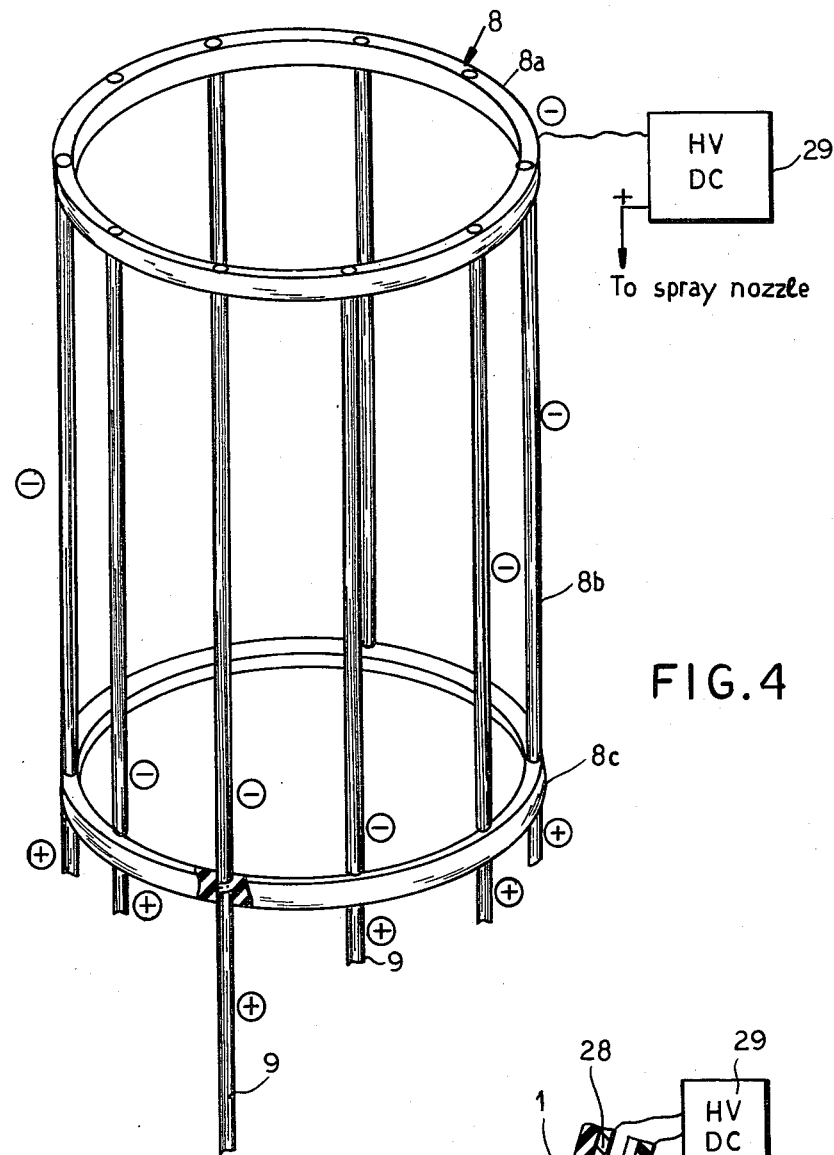
FIG. 4 is a diagrammatic fragmentary perspective view illustrating a charging cage according to the invention.
Figure 3:
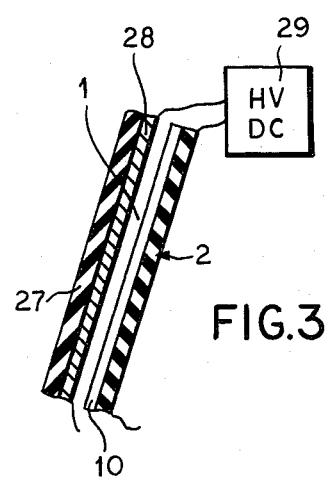
FIG. 3 is a section in the region III of FIG. 1, drawn to a larger scale.

More particularly, as can be seen from FIG. 4, the negative terminal of the high voltage DC source 29 can be connected to a metal ring 8a of the cage 8, this ring being, in turn, connected to the axially extending angularly equispaced electrodes 8b which can terminate in a ring 8c of insulating material. The non-discharge electrodes 9, forming terminal portions of the electrodes 8b but insulated therefrom, receive positive charges, as indicated, by induction.

As these charged water droplets and dust particles traverse the annular gap, the electrodynamic effects mentioned above markedly increase the number of collisions and the separation efficiency.

In the preferred and the best mode embodiment, the annular-gap washer is of the diffuser type in which the passage is basically a venturi passage with a converging or constricting portion a and a diffuser-type portion b. The central body 2 is a frustocone disposed primarily in the divergent portion b but having a small end reaching into the converging portion past the constriction.

We claim:

1. In an annular-gap washer for scrubbing a particle-containing waste gas with a scrubbing liquid and comprising a housing forming a gas passage and having a gas inlet and a gas outlet, an elongated central body disposed in said passage and defining an elongated annular gap with said housing, means for adjustably shifting said body for varying the width of said gap, a spray nozzle disposed axially in said housing between said gas inlet and said body for dispensing a spray of scrubbing liquid into a particle-containing waste gas adapted to flow through said gap, the improvement which comprises:

at least one discharge electrode disposed in said passage prior to said nozzle for electrically charging particles contained in said waste gas, said at least one discharge electrode having a non-discharge terminal portion extending into the region adjacent said nozzle and the region sprayed thereinto;

further electrode means positioned between said housing and said body across said gap and said further electrode means producing an electrostatic field therebetween with substantially radial field lines for inducing electrodynamic action in a mixture of said gas and droplets of said liquid flowing through said gap; and a high voltage electric source connected to said at least one discharge electrode and across said further electrode means.

2. The washer defined in claim 1 wherein said further electrode means includes an array of electrodes positioned on said body.

3. The washer defined in claim 1 or claim 2 wherein said at least one discharge electrode is in the configuration of a cage.

* * * * *